United States Patent [19]

Held

[11] 4,202,118
[45] May 13, 1980

[54] SNOWMOBILE TRAIL GROOMER

[75] Inventor: Ross Held, Port Hope, Canada

[73] Assignee: D. T. Equipment Limited, Port Hope, Canada

[21] Appl. No.: 961,934

[22] Filed: Nov. 20, 1978

[51] Int. Cl.² .................. E01H 5/00; A01B 59/048
[52] U.S. Cl. .................................. 37/41; 172/277
[58] Field of Search ............... 37/41, 10; 280/12 R, 280/12 U, 12 S, 13, 16, 17, 21 R, 21 A, 28.5; 172/387, 277, 804, 393

[56] References Cited

U.S. PATENT DOCUMENTS

| 2,959,201 | 11/1960 | Le Tourneau | 37/43 X |
| 3,656,557 | 4/1972 | Eskelson et al. | 172/277 |
| 4,057,916 | 11/1977 | Roemer | 172/393 |

FOREIGN PATENT DOCUMENTS 620491  5/1961  Canada ......................................... 37/10
2346805  9/1973  Fed. Rep. of Germany ........... 172/276

Primary Examiner—E. H. Eickholt
Attorney, Agent, or Firm—Ivor M. Hughes

[57] ABSTRACT

A snowmobile trail groomer, having a main cab for seating the driver, steering and control means for operating the groomer, a steerable ski at the front of the groomer, spaced from the main cab for steering and control purposes, an adjustable and tiltable blade disposed between the ski and cab, the drive means having an engine and track means comprising bogies and an endless track supported on either side of the cab, the bogies being secured within the track for driving the endless track, the track means being pivotally connected to the cab at a position on the cab for relative pivotal movement with respect to the cab, the engine for driving the bogies for driving the track, and substantial weight mounted on, and supported by, the steerable ski.

8 Claims, 6 Drawing Figures

SNOWMOBILE TRAIL GROOMER

FIELD OF INVENTION

This invention relates to an improved snowmobile trail groomer.

BACKGROUND OF THE INVENTION

The increased popularity of snowmobile trail riding has increased the need for a more effective snowmobile trail groomer. The more snowmobiles passing over any snowmobile trail, the more chewed up the trail becomes, particularly, the moguls become more and more pronounced.

Early attempts at grooming utilized a tracked vehicle pulling snowmobile trail grooming equipment. However, because the equipment was pulled and the attitude of the vehicle controlled the attitude of the equipment, proper grooming of the trail was precluded. A more novel approach has been proposed in U.S. Pat. No. 3,656,557 wherein a blade for grooming the trail including the leveling of moguls is mounted between a front steered ski and the tracked portion of the vehicle. However, the structure proposed is not effective. Essentially, all the weight of the groomer is carried substantially along the entire length of the track. In the event of the lifting of the front of the structure, (when for example, pressure is exerted on the ski by activation of the cylinder) the bearing surface of the track would be decreased with consequent spinning of the track, precluding effective trail grooming.

It is therefore an object of this invention to provide an improved snowmobile trail groomer which overcomes the deficiencies of the prior art.

Further and other objects of the invention will be realized by those skilled in the art from the following summary of the invention and detailed description thereof.

SUMMARY OF THE INVENTION

According to one aspect of the invention, a snowmobile trail groomer is provided, comprising a main cab for seating the driver, steering and control means for operating the groomer, drive means for driving the groomer, a steerable ski at the front of the groomer spaced from the main cab for steering and control purposes, an adjustable and tiltable blade disposed between the ski and cab, the drive means comprising an engine and track means comprising bogies and an endless track supported on either side of the cab, the bogies being secured within the track for driving the endless track, the track means being pivotally connected to the cab at a position on the cab for relative pivotal movement with respect to the cab, the engine for driving the bogies for driving the track, and substantial weight mounted on, and supported by, the steerable ski.

According to another aspect of the invention, the engine may be mounted over and be supported by, the ski.

According to another aspect of the invention, the position for relative pivotal movement of the track means with respect to the cab is further from the end of the cab nearest the groomer blade than the end of the cab remote the groomer blade.

According to another aspect of the invention, the blade may be constructed having its ends further from the cab than an intermediate portion between the ends.

According to another aspect of the invention, the blade may be v-shaped looking down to the blade.

According to another aspect of the invention, the bottom of the blade contacting the snow, contains saw teeth.

According to another aspect of the invention, the blade is hydraulically controlled.

According to another aspect of the invention, a snowmobile trail groomer may be provided comprising a cab for seating the driver, steering and control means for operating the groomer, drive means for driving the groomer, a steerable ski at the front of the groomer spaced from the main cab, a hydraulically adjustable and tiltable grooming blade of v-shaped configuration looking down onto the top of the blade, disposed between the ski and cab, the blade having saw teeth on the bottom thereof, the drive means comprising an engine and track means comprising bogies and an endless track supported on either side of the cab and being driven by the engine, the bogies secured within the track for driving the track, each track means being pivotally connected to the cab at a position on the cab, and the engine being mounted over, and being supported by, the ski.

According to another aspect of the invention, the position of relative pivotal movement of the track means to the cab is positioned further from the end of the cab nearest the groomer blade, than the end of the cab remote the groomer blade.

BRIEF DESCRIPTION OF THE DRAWINGS

The invention will now be illustrated having regard to the following drawings of the preferred embodiment of the invention.

DETAILED DESCRIPTION OF THE PREFERRED EMBODIMENT

Figure 1:
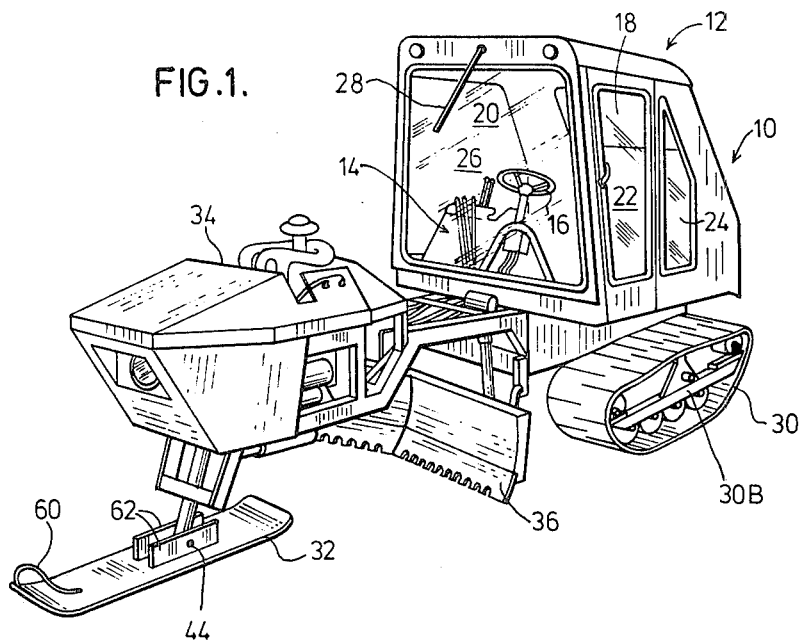
FIG. 1 is a perspective view of the snowmobile trail groomer according to the preferred embodiment of the invention.
Figure 2:
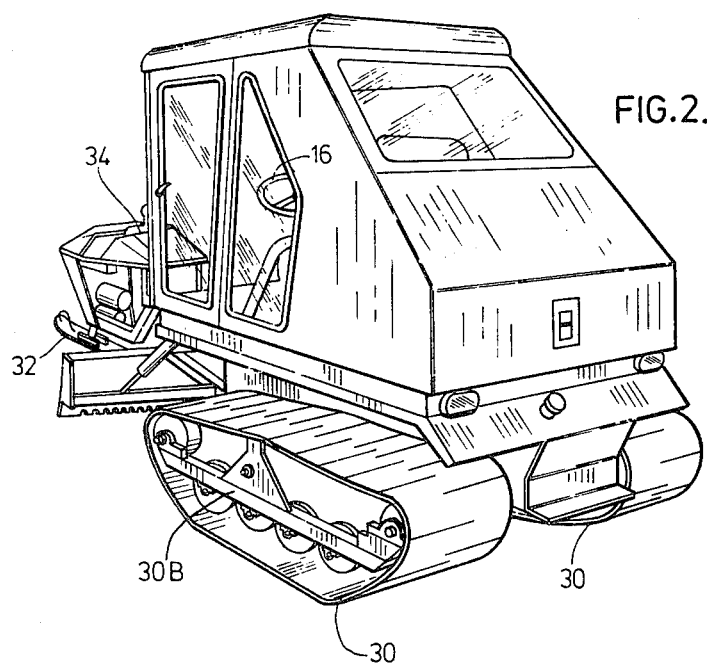
FIG. 2 is a rear view of the preferred embodiment of the invention.
Figure 4:
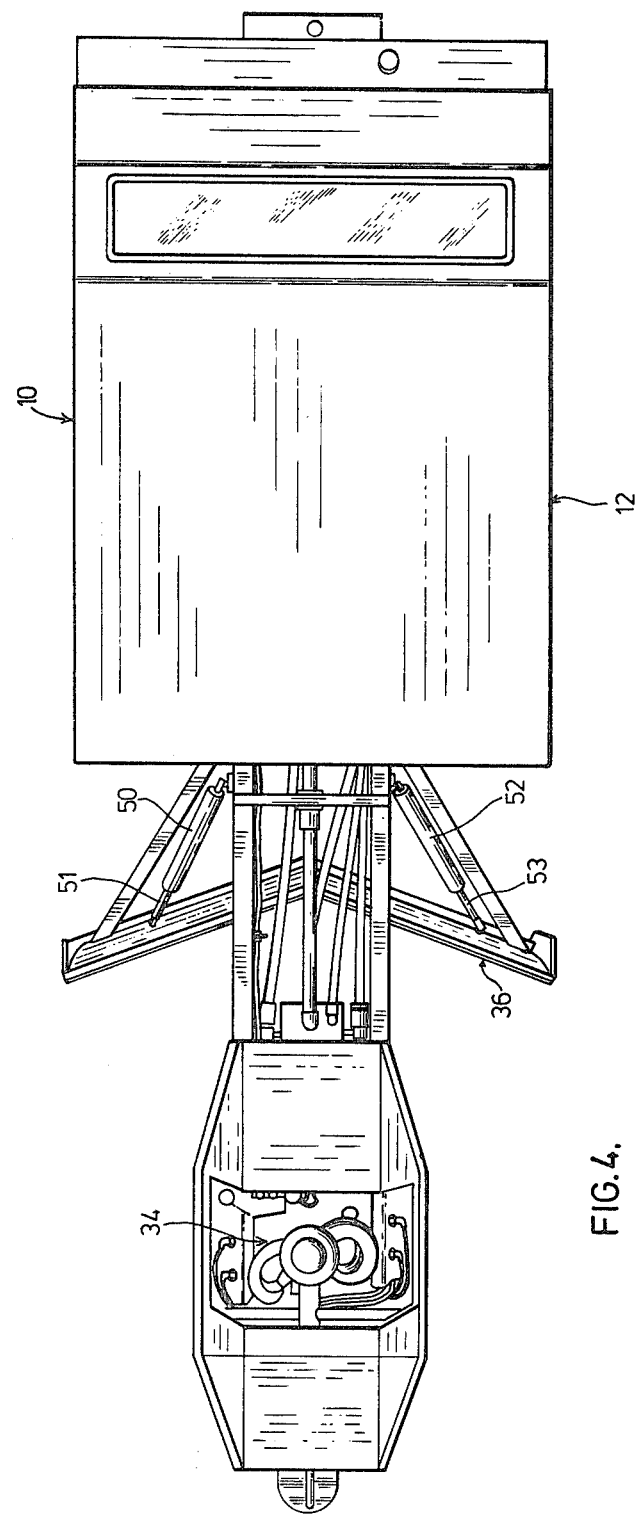
FIG. 4 is a top view of the preferred embodiment of the invention.

With reference to FIGS. 1, 2, and 4 inclusive, there is shown a snowmobile trail groomer 10, having cab 12, having steering wheel 16, door 18 and glass windows 20, 22, 24 and 26, and windshield wiper 28$^f$; engine 34 mounted over ski 32, and trail grooming blade 36 having saw teeth for trail grooming purposes; cab 12 having controls generally shown as 14 for the running of the track means 30, and steerable ski 32.

Figure 3:
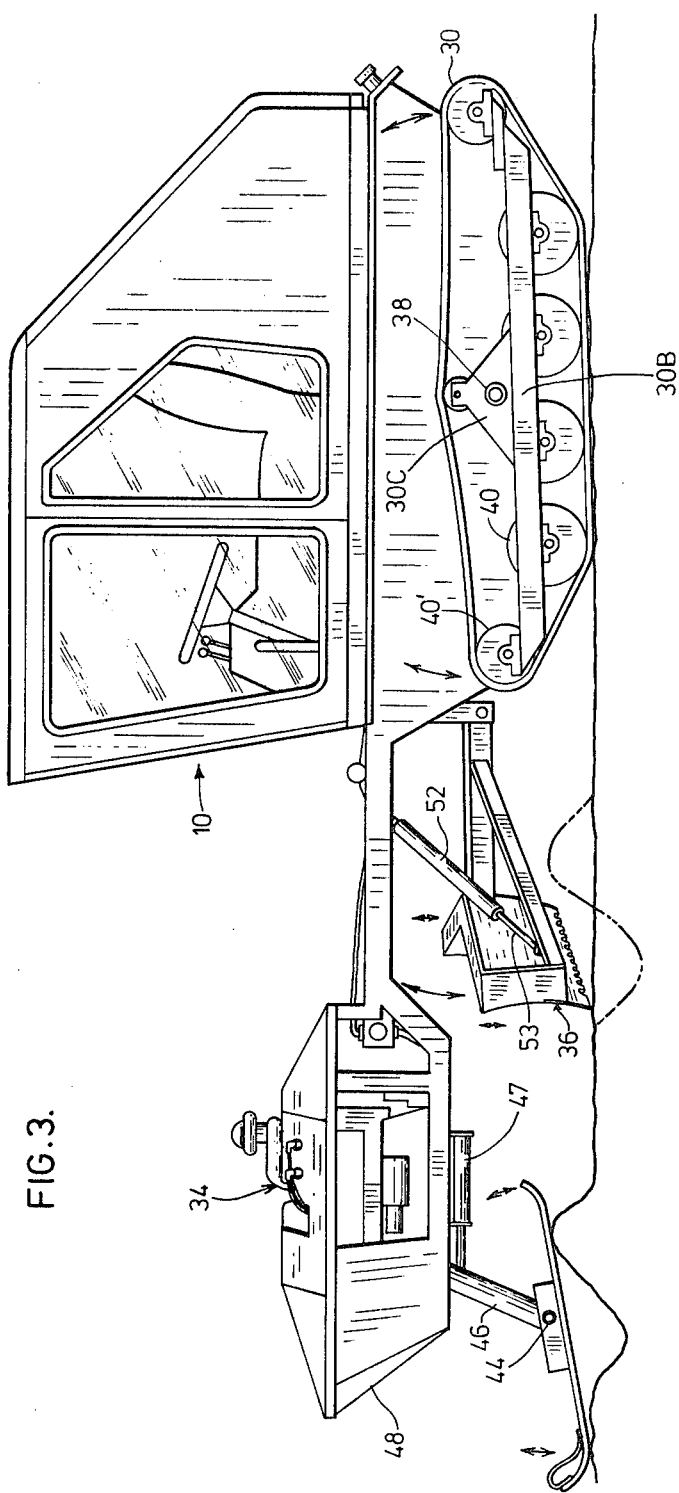
FIG. 3 is a side view of the preferred embodiment of the invention.

Track means 30 best seen in FIG. 3 is pivotable on axle 38 and comprises endless track 30 entrained on bogies 40, secured together by bar 30B and plate 30C secured to axle 38, bogey 40$^f$ being driven by the engine, by means not shown, thereby driving the remaining bogies through bar 30B. Axle 38 is spaced from the end of the cab nearest the snow grooming blade 36 by about one half the length of cab 12.

As can be seen, ski 32 is pivotable on axle 44, journalled for rotation through vertical rod 46 secured below the engine support 48. The ski is steered using cylinder 47 operated by control 14.

Ski 32 also includes a wear bar 60 in the centre and a keel near the edge on both sides 62. Axle 64 has a 20 degree camber towards the front of the machine so that when the ski is turned for steering, the side opposite the direction of the turn lifts and gives the ski an improved sideways hold for improved steering.

Figure 5:
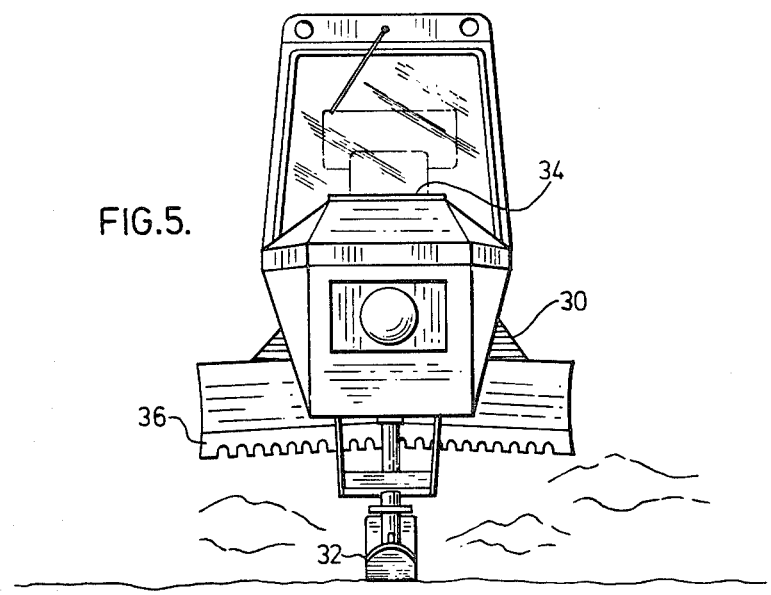
FIG. 5 is a front view of the preferred embodiment shown grooming a snowmobile trail on level terrain.
Figure 6:
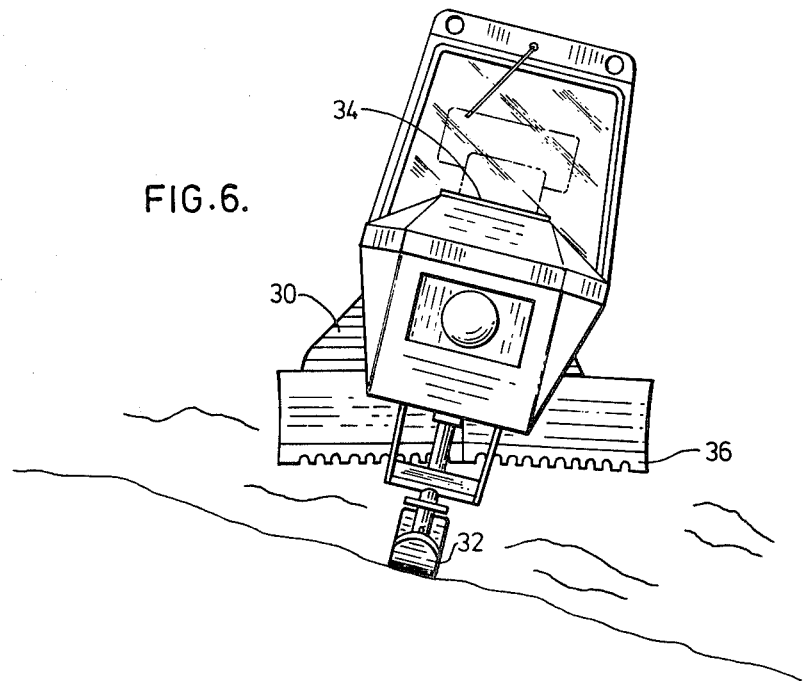
FIG. 6 is a front view of the preferred embodiment shown grooming a snowmobile trail on hilly terrain.

Trail grooming blade is mounted for vertical reciprocation (see FIG. 3) as well as angular or tilting reciprocation (seen best in FIGS. 3, 5 and 6).

With reference to FIGS. 3 and 4, the vertical reciprocation and/or tilting of the blade is accomplished through hydraulic means employing pistons 50 and 52 secured to either end of blade 36, blade 36 being of the configuration looking down on the blade with its central portion being closer to the cab and track 30 than its outer ends. If both pistons withdraw arms 51 and 53 within the cylinder, the blade may be raised and tilted depending on the amount of reciprocation of each arm. For example, the blade can be tilted as shown in FIG. 6 or maintained horizontally as shown in FIG. 5.

The engine 34 is secured to the controls 14 in the usual manner, weighs about 600 pounds and is a four cylinder, gasoline, 1600 c.c. Ford Engine in line with an alternator, electric starter and heater. The transmission is a Sundstrand 18 Series, Hydrostatic 3000 P.S.I. Closed System, infinitely variable forward, reverse and park.

Endless track 30 is 161" by 15" two ply nylon with moisture and wear resistent covering and runs on 16 steel bogies 40 with air core rubber tires, replaceable cleats and sprocket lugs.

The steering comprises an "Orbitral" Hydraulic System acting on the front ski employing a conventional steering wheel.

Therefore, with substantial weight over the ski (600 of the approximately 1,500 pounds for the entire groomer) the necessary pressure has been provided on the steering ski to enable the groomer to follow the contour of the land without any loss of bearing surfaces. As a result, because of the single pivot of the track, and the weight over the front ski, there is a minimal lifting tendency of the front end when in use.

As many changes could be made to the preferred embodiments of the invention without departing from the scope thereof, it is intended that all matter contained herein being interpreted as illustrative and not in a limiting sense.

The embodiments of the invention in which an exclusive property or privilege is claimed are as follows:

1. A snowmobile trail groomer comprising a main cab for seating the driver, steering and control means for operating the groomer, a steerable ski at the front of the groomer spaced from the main cab for steering and control purposes, an adjustable and tiltable blade disposed between the ski and cab, the drive means comprising an engine and track means comprising bogies and an endless track supported on either side of the cab, the bogies being secured within the track for driving the endless track, the track means being pivotally connected to the cab at a position on the cab for relative pivotal movement with respect to the cab, the engine for driving the bogies for driving the track, and substantial weight mounted on, and supported by, the steerable ski.

2. The snowmobile groomer of claim 1, wherein the engine may be mounted over and be supported by, the ski.

3. The snowmobile trail groomer of claim 1 wherein the position for relative pivotal movement of the track means with respect to the cab is further from the end of the cab nearest the groomer blade than the end of the cab remote the groomer blade.

4. The snowmobile groomer of claim 1 wherein the blade is constructed having its ends further from the cab than an intermediate portion between the ends.

5. The snowmobile of claim 1, 4, or 5 wherein the blade is hydraulically controlled.

6. The snowmobile groomer of claim 1, wherein the blade is v-shaped looking down to the blade.

7. A snowmobile trail groomer comprising a main cab for seating the driver, steering and control means for operating the groomer, drive means for driving the groomer, a steerable ski at the front of the groomer spaced from the main cab, a hydraulically adjustable and tiltable grooming blade of V-shaped configuration looking down onto the top of the blade, disposed between the ski and cab, the blade having saw teeth on the bottom thereof, the drive means comprising an engine and track means comprising bogies and an endless track supported on either side of the cab and being driven by the engine, the bogies secured within the track for driving the track, each track means being pivotally connected to the cab at a position on the cab and the engine being mounted over, and being supported by, the ski.

8. The snowmobile groomer of claim 7 wherein the position of the relative pivotal movement of the track means to the cab is positioned further from the end of the cab nearest the groomer blade, than the end of the cab remote the groomer blade.

* * * * *